Jan. 23, 1951  R. I. LAPPIN ET AL  2,538,750
ADAPTER FOR WINDSHIELD WIPER MOTORS
Filed Feb. 18, 1949  2 Sheets-Sheet 2
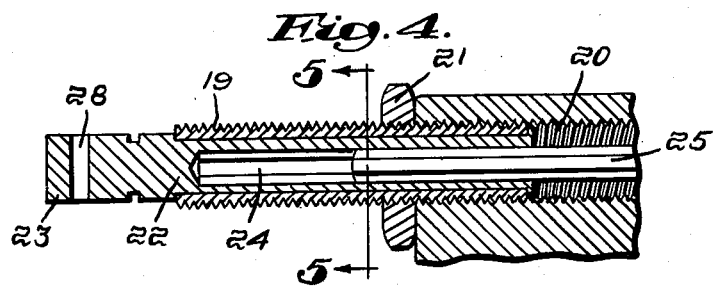
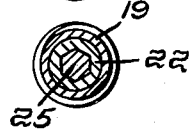
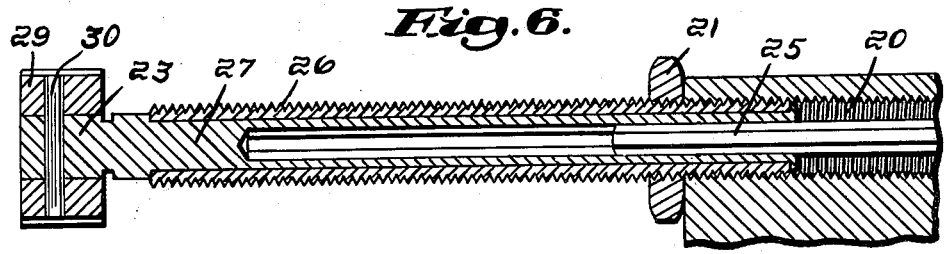
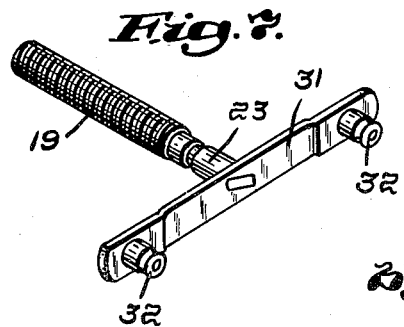
Inventors:
Louis Zaiger,
Robert I. Lappin,
by Thomson & Thomson
Attorneys Patented Jan. 23, 1951

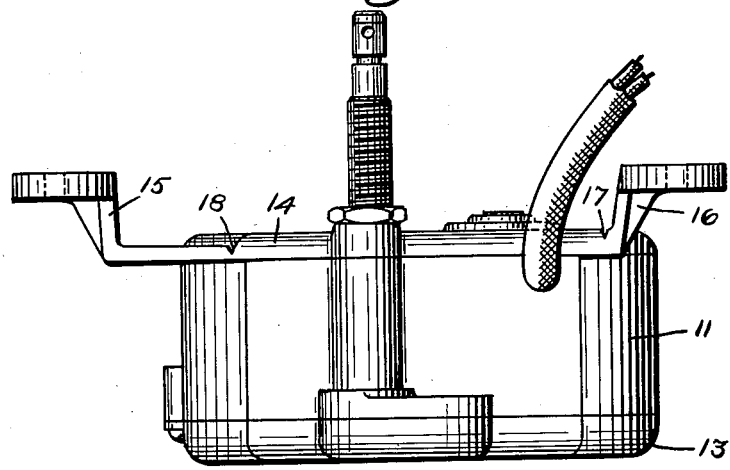
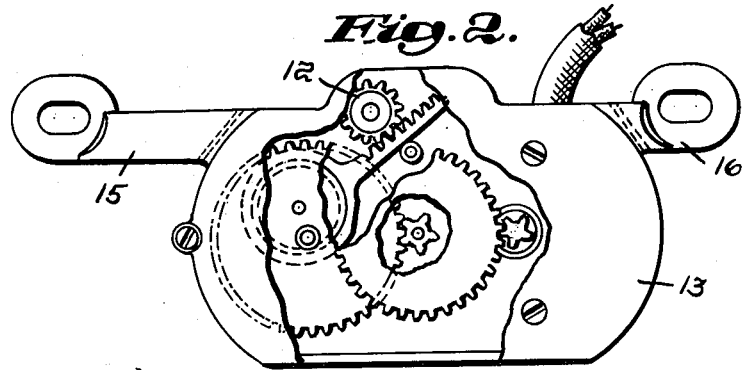
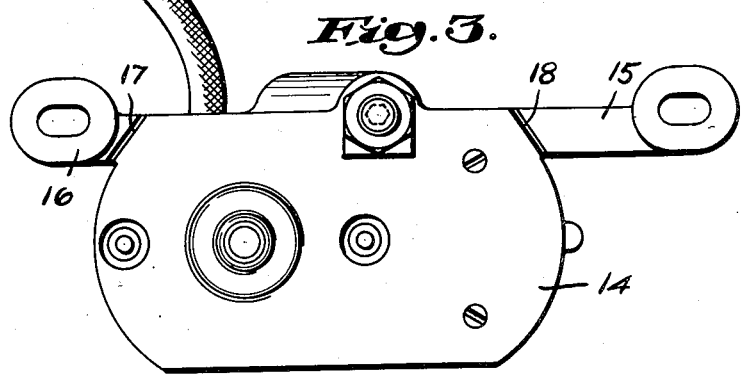

2,538,750

UNITED STATES PATENT OFFICE 2,538,750

ADAPTER FOR WINDSHIELD WIPER MOTORS

Robert I. Lappin, Marblehead, and Louis Zaiger, Swampscott, Mass.

Application February 18, 1949, Serial No. 77,184

6 Claims. (Cl. 74—78)

This invention relates to windshield wiper motors, and pertains more particularly to improvements in the operating shaft which is connected to the reciprocating windshield wiper arm and oscillated by an electric motor or by a vacuum motor.

Heretofore it has been found necessary to provide windshield wiper motors of varying sizes or styles, or motors having operating shafts or bushings of varying dimensions, in order to provide individual installations for the varying types and styles of windshields in the various makes and models of passenger automobiles and trucks. Many different motor models have been produced to satisfy these varying conditions in the thickness, slope, height and shape of the windshield; and different types of motor cases have also been provided for the so-called "one-hole" or "three-hole" types of mountings of the motor on the vehicle. One manufacturer produces thirty-seven models of the one-hole mounting type of motor for automobiles manufactured between 1931 and 1948.

It is accordingly the principal purpose of the present invention to provide a wiper motor having an operating shaft or bushing which is adjustable in length to accommodate a suitable wiper arm for varying windshield styles or types, and which has a removable actuating element replaceable by a similar element of different length, so that the replaceable element is also adjustable in length and suitable for use in operating wiper arms on still additional types and styles of windshields. The removable actuating element is also adapted to be replaced by a modified element adapted to accommodate dual windshield wipers.

Another object of the invention is to provide a motor having a case which may be employed either for the one-hole type of mounting or the three-hole type of mounting.

Other improved features and advantages of the invention will be evident from the following description of a recommended embodiment thereof, as illustrated in the accompanying drawings; but it will be understood that the structural details of the devices herein illustrated and disclosed may be varied without departing from the essence of this invention as defined in the appended claims. It will also be understood that the internal mechanism of the motor forms no part of this invention and may be of any conventional or desired character, either of the electric or vacuum types.

In the drawings:

Fig. 1 is a plan view of an electric wiper motor constructed in accordance with this invention;

Fig. 2 is a front elevation of the motor, partly broken away;

Fig. 3 is a rear elevation of the motor;

Fig. 4 is a fragmentary longitudinal section of the motor casing, showing one form of the improved, adjustable operating shaft;

Fig. 5 is a section on line 5—5 of Fig. 4;

Fig. 6 is a view similar to Fig. 4 showing another, alternative form of the operating shaft of the motor, and also illustrating a modified form of coupling for the windshield wiper arm; and Fig. 7 is a perspective view of still another form of replaceable element of the operating shaft, designed particularly for the operation of dual windshield wipers.

In the particular embodiment illustrated in Figs. 1 to 5 of the drawings, the improved wiper motor comprises a casing having a body portion 11 containing an electric motor (not shown) and suitable shaft oscillating mechanism, such as the gearing, cam rack and drive pinion 12 shown in Fig. 2, a front plate 13 and a rear plate 14 screwed or otherwise removably fastened to the casing body; mounting lugs 15 and 16 for a three-hole mounting, integral with the back plate 14, but provided on one side at least with transverse grooves 17 and 18 respectively, disposed close to the casing body, so that said lugs may be snapped off at the grooved lines, to adapt the motor for one-hole mounting in a conventional manner; and an operating or drive shaft, constructed as described below and actuated by the oscillating drive pinion 12.

The improved operating shaft comprises, as best shown in Fig. 4, an externally threaded bushing 19 which is received in an internally threaded hole 20 extending across the top of the motor casing. The bushing may be threaded into the hole 20 to any desired distance, and secured in adjusted position by a lock nut 21. Rotatable within the bushing 19 but suitably restrained against movement longitudinally thereof, is a torque tube 22 having an outer end or head 23 designed for attachment to a wiper arm. To prevent relative longitudinal movement between the bushing and the torque tube, while permitting the tube to rotate in the bushing, the tube may be formed with annular shoulders engaging the respective ends of the bushing, as shown in the drawings (Figs. 4 and 6), or other means may be provided for assembling the parts in such relationship, to provide an actuating unit forming a replaceable element of the improved operating shaft.

The inner portion of the tube 22 preferably has a bore 24 of hexagonal cross section shown in Figs. 4 and 5, to receive a drive shaft 25 of corresponding, non-circular cross section, whereby the torque tube has a slideable, driving connection with the hexagonal shaft 25 and is rotated in response to rotation of the shaft 25 by the drive pinion 12 to which the shaft is suitably connected. It will be apparent however that the slideable operating connection between the tube 22 and drive shaft 25 may be provided by equivalent means, including one or more complemental keys and keyways or multiple splines, as well as by square or other non-circular surfaces. Any of these expedients are contemplated by the use of the term "slideably keyed" in the appended claims.

The relatively short bushing 19 shown in Fig. 4 may have a length of 1⅜". Such a bushing may be adjusted to provide an exterior extension between ¼" and 1 3/16".

A relatively longer bushing 26, and a correspondingly longer torque tube 27 is shown in Fig. 6. The bushing 26 may be 2½" long, and such a bushing may be adjusted to provide an exterior extension between 1¼" and 2¼".

It will be understood that the respective torque tubes and bushings are produced and assembled as a unit, and that the shorter or the longer unit is selectively insertable in the threaded hole 29 of the motor casing, so that either may be used according to the characteristics of the windshield and windshield frame on which the wiper motor is to be mounted. It will also be appreciated that the effective, exterior length of the respective replaceable actuating units may be adjusted to minute variations, the adjustment being fixed by the lock nut 21, as aforesaid. The hexagonal drive shaft 25 is, of course, permanently installed in the motor case.

The torque tube end 23 of Fig. 4 is adapted to receive within its transverse opening 28, the wirelike end of a wiper arm, which is secured therein in accordance with common practice. For wiper arms having socket type couplings for attachment to the operating shaft, the head 23 of the torque tube may be provided with an adapter bushing 29, retained by a pin 30, passing through the hole 28, as shown in Fig. 6.

For use with dual windshield wipers, a replaceable actuating unit, consisting of a torque tube similar to tubes 22 or 27 and a bushing similar to the bushing 19 or 26, is provided with a crank arm 31 having a pair of crank pins 32, the crank arm being suitably fastened to the head 23 of the torque tube, as shown in Fig. 7.

It is thus evident that the improved operating shaft is universally adaptable for different types of wiper arm connections, as well as adjustable to the proper length, to work effectively in a one-hole mounting, irrespective of the size, shape or other dimensional characteristics of the windshield or windshield frame on which the motor is to be mounted. The lugs 15 and 16 of the motor case further adapt the improved motor for a three-hole mounting, the lugs being snapped off as aforesaid when a one-hole mounting is to be employed. The improved motor can accordingly be utilized as a replacement for electric or vacuum driven wiper motors of various styles and models heretofore manufactured for the variety of automobile makes and models now on the market. By providing actuating units of two selective lengths, the entire range of selectivity is adequately accommodated; and, for dual wipers, it is easily possible to furnish the proper driving connection by simply replacing an actuating element like that of Fig. 4 or 6 by a modified actuating unit like that shown in Fig. 7.

We claim:

1. A windshield wiper motor comprising a casing having an opening for an operating shaft, a drive shaft operatively connected to the motor mechanism and extending outwardly toward said opening, a removable and replaceable actuating unit oscillatable by said drive shaft and including a bushing threading into said casing opening to adjusted position therein, and a torque tube rotatably mounted in said bushing and slidably keyed to said drive shaft, the outer end of said tube being adapted for attachment to a wiper arm, and means for locking the bushing in adjusted position with respect to the casing.

2. A windshield wiper motor comprising a casing having an opening for an operating shaft, a drive shaft operatively connected to the motor mechanism and extending outwardly toward said opening, a removable and replaceable actuating unit oscillatable by said drive shaft and including a bushing threading into said casing opening to adjusted position therein, and a torque tube rotatably mounted in said bushing and slideably keyed to said drive shaft, the outer end of said tube having a transverse crank arm connected thereto, said arm having a pair of crank pins adapted to be connected to a pair of wiper arms, and means for locking said bushing in adjusted position with respect to the casing.

3. A windshield wiper motor comprising a casing having a threaded opening leading from the interior thereof to one exposed side, a drive shaft operatively connected to the motor mechanism and extending outwardly into said opening, said shaft having a non-circular cross-section, a removable and replaceable actuating unit oscillatable by said drive shaft and including an externally threaded bushing threading into said casing opening to a plurality of adjusted positions therein, and a torque tube rotatably mounted in said bushing and slideably keyed to said drive shaft, the outer end of said tube being adapted for attachment to a wiper arm, means preventing relative longitudinal movement between the bushing and the torque tube, and means for locking the bushing in adjusted position with respect to the casing.

4. A removable and replaceable actuating unit for a windshield wiper motor having a casing provided with an opening communicating with a drive shaft connected to the motor mechanism and extending axially with respect to said opening, said actuating unit comprising a threaded bushing engageable in said opening and rotatable to adjustable position therein, a torque tube rotatably mounted in said bushing and slidably connectable with said drive shaft, the outer end of said tube being connectable to a wiper arm, means for locking the bushing in adjuste position with respect to the casing, and mea preventing relative rotation between said tube and said drive shaft when said parts are slidably connected.

5. A removable and replaceable actuating unit for a windshield wiper motor having a casing provided with an opening communicating with a drive shaft connected to the motor mechanism and extending axially with respect to said opening, said actuating unit comprising a threaded bushing engageable in said opening and rotatable to adjustable position therein, a torque tube rotatably mounted in said bushing and slidably connectable with said drive shaft, means preventing relative longitudinal movement between the bushing and tube, the outer end of said tube being connectable to a wiper arm, a nut for locking the bushing in adjusted position with respect to the casing, the end of said drive shaft having a non-circular cross-section and the bore of said tube having a complemental cross-section, thereby to prevent relative rotation between said tube and said drive shaft when said parts are slidably connected.

6. A removable and replaceable actuating unit for a windshield wiper motor having a casing provided with an opening communicating with a drive shaft connected to the motor mechanism and extending axially with respect to said opening, said actuating unit comprising a threaded bushing engageable in said opening and rotatable to adjustable position therein, a torque tube rotatably mounted in said bushing and slidably connectable with said drive shaft, the outer end of said tube having a transverse crank arm attached thereto, said arm having a pair of crank pins adapted to be connected to a pair of wiper arms, means for locking the bushing in adjusted position with respect to the casing, and means preventing relative rotation between said tube and said drive shaft when said parts are slidably connected.

ROBERT I. LAPPIN.
LOUIS ZAIGER.

REFERENCES CITED

The following references are of record in the file of this patent:

UNITED STATES PATENTS

| Number | Name | Date |
|---|---|---|
| 932,784 | Kennedy | Aug. 31, 1909 |
| 935,351 | Bandy | Sept. 28, 1919 |
| 1,666,972 | Miller et al. | Apr. 24, 1928 |
| 1,783,446 | Overbury | Dec. 2, 1930 |
| 1,964,401 | Hueber | June 26, 1934 |